Figure 1:
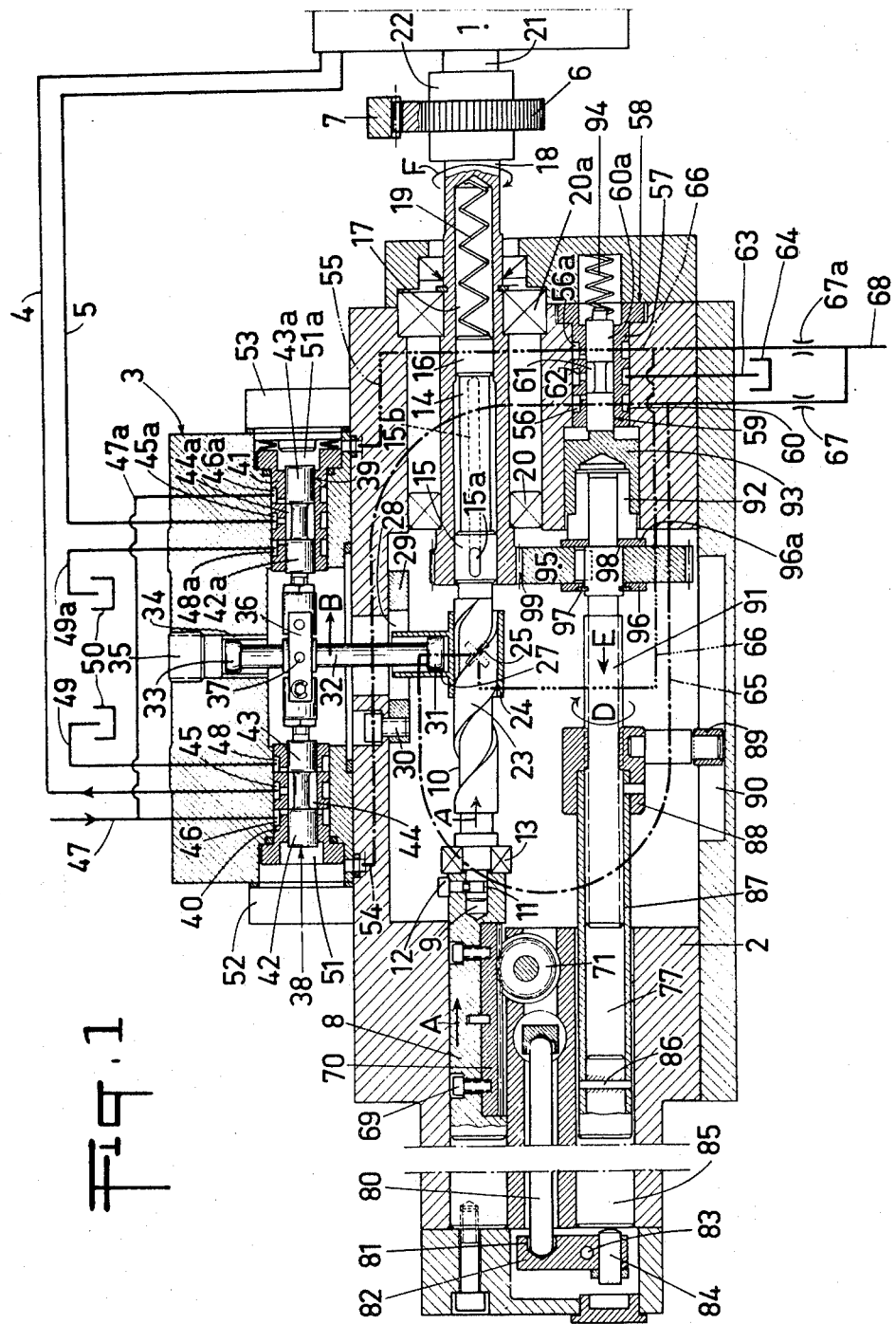

United States Patent
Cloup

[15] 3,635,575
[45] Jan. 18, 1972

[54] CONTROL MEANS FOR FLUID-OPERATED DRIVE MEMBERS

[72] Inventor: Jean Cloup, Latresne, France
[22] Filed: June 3, 1970
[21] Appl. No.: 43,132

[30] Foreign Application Priority Data

June 5, 1969 France..................................6918529

[52] U.S. Cl.................................................415/1
[51] Int. Cl.................................................F01d 13/00
[58] Field of Search...................................415/1, 17

[56] References Cited

UNITED STATES PATENTS 3,574,474 4/1971 Lukacs.....................................415/17
3,574,475 4/1971 Wolff........................................415/17

Primary Examiner—C. J. Husar
Attorney—Waters, Roditi, Schwartz & Nissen

[57] ABSTRACT

This invention relates to methods of and means for controlling a fluid-operated drive member arranged to position a movable member, e.g., a tool rest of a machine tool, in a predetermined position. According to the invention, the predetermined position is indicated by respective displacements of at least two members acting on control means for the drive member itself and one of these members is displaced determining the number of rotations of a shaft indicating the displacement of the drive member, the displacements of the other member, fixing the fractional value of rotation of the drive shaft. The invention also provides a device for carrying out this method.

6 Claims, 5 Drawing Figures

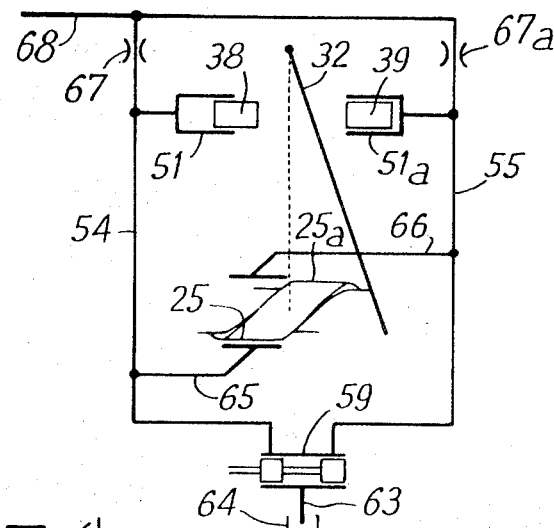
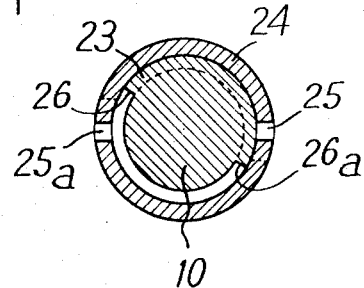
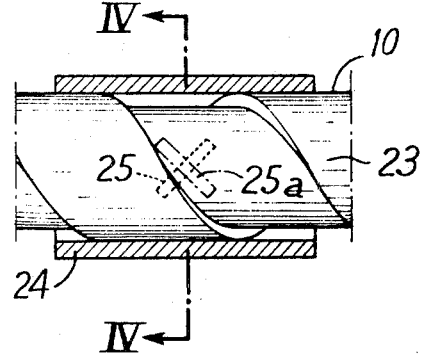
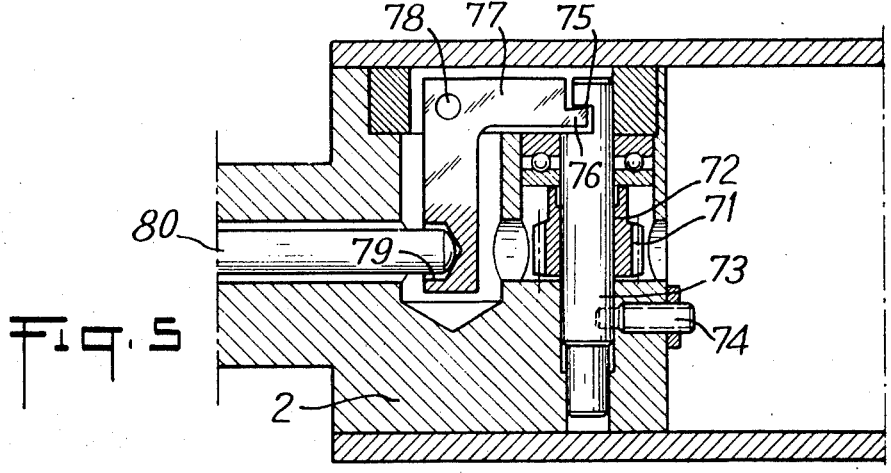

CONTROL MEANS FOR FLUID-OPERATED DRIVE MEMBERS

The present invention relates to fluid-operated drive members and particularly to a method of and means for controlling such a drive member.

Servomechanisms are known for the linear positioning of a moving body operating on the basis of digital information and in which a certain number of driving stages are used in cascade, each stage being controlled by an electromagnet and which act on a distributor supplying a power-amplifying jack connected to the moving body, the said jack being connected to the distributor by a position control device.

However, these known systems, owing to the very fact that they comprise jacks having linear displacement, have a predetermined course of path, and limitation results in the displacement of the moving body to be positioned.

According to the method of the invention, the predetermined position is indicated by the respective displacements of at least two members acting on means for controlling the drive member, the displacement of one of these members determining the number of rotations of a shaft indicating the displacement of the drive member and the displacement of the other member fixing the fractional value of one rotation of the said shaft.

With the method according to the invention, it is therefore possible to use a drive member supplied by a fluid which ensures the drive of the moving member and displacement can be detected as a function of the number of rotations on the shaft indicating the displacement of the drive member. This is in contradistinction to known systems in which a linear displacement has to be detected as a result of which the course or path of the moving body is limited.

On the other hand, in the inventive arrangement, a member is arranged to effect a preliminary adjustment of the moving member as a function of the number of rotations of the shaft indicating the displacement, and of a member effecting exact and more accurate adjustment, according to a fractional value of one rotation of the said shaft.

With this method, it is therefore possible to obtain a very accurate positioning of the moving member by using a large number of divisions of one rotation of the shaft.

Also according to the present invention, the control device comprises a first control member subjected to linear displacements, on which is mounted a screw that is rotatable by a shaft controlled from the drive member, the said screw cooperating with a sensor sleeve mounted to slide on the screw and acting on a fluid supply distributor for the drive member, a second control member adapted to act for a corresponding displacement greater than one rotation of the screw, the said second control member being connected to the valve of a saturation gate or valve of the sensor device.

The sensor device used comprises a screw cooperating with a sensor sleeve having two slots for the fluid flow whose effect on the thread of the screw, causes by reaction, displacement of the sleeve which controls the operation of the distributor supplying the drive member.

This arrangement allows the moving member to be moved at a speed which decreases as it approaches its end position.

Other characteristics and advantages of the present invention will appear from the following description of one embodiment given only by way of nonlimiting example, made with reference to the accompanying drawings, in which:

FIG. 1 is a sectional view of the control device for a fluid-operated motor according to the invention, FIG. 2 is a diagram of the hydraulic control circuit, FIG. 3 is a view, to an enlarged scale, of the sensor device, FIG. 4 is a sectional view of the sensor device along the line IV—IV of FIG. 3, and FIG. 5 is a sectional view of a detail showing the link means for the first and second control members.

Referring now to the drawings, FIG. 1 shows a control device for a fluid-operated drive member indicated at 1, and which is more particularly an hydraulically or pneumatically operated member. The control device per se comprises a body member 2 on which is fixed a distributor 3 connected in known manner by supply conduits 4 and 5 to the member 1.

In the embodiment shown, the drive member 1 is of a rotary nature, but it will be apparent that it could operate in any other desired way, e.g., linearly.

A pinion 6 meshing with a rack 7 is keyed to a shaft 21 of the drive member 1, for effecting the displacement of a moving member, e.g., the bed of a machine tool connected to the rack 7.

A first control member is mounted to slide in the body 2 of the device, and constituted, for example, by a rod 8 which is subjected to displacements related to the displacements which it is desired to submit to the moving member, driven by the fluid motor 1.

For controlling the sliding rod 8, there may be used a certain number of well-known drive stages in cascade, operating on the basis of digital information.

At its opposite end, the rod 8 has a recess 9 in which is engaged one of the ends of a screw 10 which has a circular groove 11 in which is engaged the end of a fixed test screw fixed in the rod 8, a roller bearing 13 being mounted between the rod 8 and the screw 10.

At its other end, the screw 10 is extended by a rod 14 having two shoulder portions 15 and 16 which are mounted to slide in a bore 17 of a shaft 18 against the action of a spring 19 whose other end bears against the bottom of the bore 17. The shoulder 15 has a key 15a sliding in a slot 15b of the shaft 18. The shaft 18 is rotatably mounted in the body 2 by means of two roller bearings 20, 20a, and it is coupled to the shaft 21 of the drive member 1 by a coupling sleeve 22 which may bear the pinion 6 as shown.

A sensor sleeve 24 is slidably mounted on the screw 10 (FIG. 1, 3 and 4) which is provided with a very coarse thread 23, and this sensor sleeve has two diametrically opposed slots 25, 25a, which are orientated to follow the thread 23 of the screw 10, so as to cooperate with faces 26, 26a of the thread.

The sensor sleeve 24 is integral with a tubular member 27 mounted to slide through a slot 28 in a plate 29, fixed to the body member 2 by means of screws 30.

A ball or swivel 31 is engaged in the said tubular member 27, provided on one of the ends of a rod 32 forming a beam and whose other end has a swivel or ball 33 mounted in a recess 34 of a tubular member 55 screwed in the body of the distributor 3.

In the intermediate part of the rod 32, support plates 36 are articulated at 37 and on the two ends of which are fixed valves 38, 39 mounted to slide in linings 40 and 41 fixed in the body of the distributor 3.

The slide valves 38, 39, the plates 36 and the rods of the beam 32 form a moving assembly connected to the sensor sleeve 24 and adapted to pivot towards the right or left about a neutral position, to follow any displacement of the sleeve 24.

The valves 38 and 39 have projections 42, 43 and 42a, 43a, separated by an annular chamber 44, 44a capable of selectively linking the annular chambers 45, 45a connected to the supply conduits 4 and 5 of the motor 1, either to annular chambers 46, 46a, connected by conduits 47, 47a to a course of fluid under pressure, or to annular chambers 48, 48a connected by conduits 49, 49a to a tank 50.

At one of their ends, the valves 38 and 39 are arranged in a chamber 51, 51a located between the linings 40, 41 and closed by sealing plugs 52, 53, fixed within the body of the distributor 3.

These chambers 51, 51a are connected by conduits 54, 55 respectively to annular chambers 56, 56a shaped in a lining 57 in a saturation gate or valve 58 located in the body 2 of the control device.

A valve 59 having two projections 60, 60a is mounted to slide in the lining 57 between which an annular chamber 61 is provided capable of selectively linking the chamber 56, 56a to an annular chamber 62 joined by a conduit 63 to a tank 64.

The annular chambers 56, 56a are connected in parallel by conduits 65 and 66 to the slots 25, 25a provided in the sensor sleeve 24 and they are connected through calibrated orifices of reduced cross section 67, 67a to a conduit 68 discharging in a pressurized fluid source.

The diagram of the supply circuit described above is shown in FIG. 2.

On the rod 8 of the first control member is fixed by means of screws 69, a rack 70 meshing with a pinion 71 (FIG. 1 and 5) having an inner thread 72 by which means it is engaged with a screw 73 guided by a teat 74 screwed within the body 2 of the device, the said screw 73 having at one of its ends a notch 75 in which is engaged a point 76 of a cranked lever 77 articulated about a spindle 78.

The cranked lever 77 has at its other end a recess 79 in which is engaged one of the ends of a rod 80 slidably mounted in the body 2 and engaged at its other end in a recess 81 of a lever 82 articulated about a spindle 83, the said lever 82 having at its other end an adjusting screw 84 bearing against one of the ends of a control member 85 for a displacement of the moving member, greater than one rotation of the shaft 21 of the drive member.

This control member 85, like the control member for the rod 8, can be formed more particularly by a certain number of well-known drive stages in cascade, operated on the basis of digital information.

At the other end of the control member 85 is fixed a tubular member 87 by means of a key 86, on which is secured a nut 88 integral with a finger 89 guided in a groove 90.

A screw 91 is mounted to slide in the tubular member 87 which is engaged in the nut 88, the said screw carrying at one of its ends a sleeve 92 provided with a thrust ball bearing which is engaged in a push member 93 bearing against the valve 59 of the saturation gate or valve 58 under the action of the spring 94 bearing against the body 2 of the device. A pinion 95 resting on two washers 96, 96a is keyed to the screw 91, one washer 96 bearing against a bush 97 fixed to the screw 91 and the other washer 96a bearing against a shoulder 98. The pinion 95 meshes with a pinion 99 provided on one of the ends of the shaft 18 driven by the motor.

The control device operates in the following manner:

In order to obtain positioning of the movable member driven more particularly by the rack 7, the rod 8 is displaced by a certain distance in the direction of the arrow A, together with the screw 10 whose rod 14 slides in the bore 17 of the shaft 18 by compressing the spring 19.

The sensor sleeve 24 is also driven by hydraulic reaction in the direction of arrow A, by closing the slot 25 as shown in the diagram of FIG. 2. The sleeve 24 follows the screw 10 when braking occurs, in order again to achieve the equilibrium which existed before displacement of the screw.

Beyond the braking zone, the slot 25 is closed and the slot 25a is opened.

The valve 59 of the saturation gate or valve 58 being in the position shown in FIG. 2, one end of each conduit 54 and 55 is closed and the chamber 51 is placed under pressure, the slot 25 being closed and the conduit 67 being connected to the source of fluid under pressure.

On the other hand the slot 25a being opened, whereby there is a drop in pressure in the chamber 51a, and the valves 38 and 39 and beam 32 are displaced in the direction of the arrow B.

By means of its annular chamber 44, the slide valve 38 places the annular chambers 45 and 48 in communication, thus connecting the conduit 4 leading to the drive member 1 to the conduit 49 of the tank 50 and the annular chambers 45a, 46a, thus connecting the conduit 5 leading to the drive member, to the conduit 47a connected to the source of fluid under pressure.

The drive member 1 is therefore supplied with fluid under pressure and it drives the rack 7 by means of the pinion 6 as well as the moving member integral with this latter.

However, the shaft 21 of the drive member 1 being integral with the shaft 18, it rotates the latter in the direction of arrow F, together with the screw 10 which is connected to the shaft 18 by a key 15a moving in a slot 15b.

The fillet of the screw 10 is therefore set in an identical position to that which it occupied at the outset and consequently the sleeve 24 follows the displacement of the screw 10, as has been explained above and also returns to its initial position shown on FIG. 1.

The slots 25, 25a are again in a balanced position opposite the faces 26, 26a of the fillet 23 of the screw 10, and the pressure of the fluid in the chambers 51, 51a being equal, the beam 32 is set in the position of FIG. 1, in which the communication between the conduits 4 and 5 leading to the motor and to the source of pressurized fluid, is interrupted.

In this manner, it is possible to impart to the drive member 1 and the moving member which it drives, a predetermined displacement which is interrupted when the moving member has reached a position predetermined by the displacement of the screw 10.

If a plurality of rotations of the screw 10 are necessary to bring the movable member to a predetermined position, the control member 8 acts in the direction of arrow A to impart to the screw 10 a displacement corresponding to a predetermined fraction of one rotation of the shaft 21, when the control member 85 also acts in the direction of arrow A, to impart to the tubular member 87 and the screw 91 which controls the valve 59 of the saturation gate or valve 58, a displacement corresponding to a whole number of rotations determined by the shaft 21 of the motor and consequently of the screw 10.

A displacement results identical to that described above of the sleeve 24, the slot 25 being closed and the slot 25a being open, the chamber 51 is under pressure when the pressure is substantially nil in the chamber 51a.

The rod 32 of the beam is displaced in the direction of arrow B together with the valves 38, 39 which ensure that the motor is supplied with fluid through the conduits 4 and 5.

Simultaneously, the screw 91 by its displacement in the direction of arrow A drives the valve 59 of the saturation gate or valve 58 in the same direction against the action of the spring 94, linking the conduit 55 with the tank 64, by means of the annular chamber 61 of the valve 59 and the conduit 54 linked to the conduit 68 of the source of fluid under pressure.

The valves 38, 39 and the rod 32 of the beam are therefore retained in the position shown in FIG. 2, for the chamber 51 is pressurized and the chamber 51a which is connected to the tank and to the slot 25a in an open position, is at substantially negative pressure.

The drive member 1 which is supplied as has been described above, drives the shaft 18 to which it is connected by the sleeve 22 and causes rotation of the pinions 99 and 95 which drive the screw 91 in the direction of arrow D.

Moreover, the screw 91 cooperates with the nut 88 which is fixed in rotation by the finger 89 engaged in the slot 90 and the screw 91 is axially displaced in the direction of arrow E, i.e., in the opposite direction to arrow A, so as to set the valve 59 in the position shown on FIGS. 1 and 2 for which the conduits 54 and 55 are connected to the conduits 65 and 66 by annular chambers 56 and 56a, as well as to the fluid conduit 68.

The displacement of the screw 91 in the opposite direction corresponds to the initial displacement which was imparted thereto by the control member 85 and consequently to the number of rotations of the shaft 21 of the drive member.

However, although the saturation gate or valve 58 has returned to its initial position, the sleeve 24 is still in the same position which was imparted thereto by the rod 8 or control member for which the slot 25 is closed and the slot 25a is open.

This arrangement allows the valves 38, 39 and the rod 32 of the beam to be retained in the position of FIG. 2 so as to effect a supply of fluid to the drive member 1, although this latter may even travel through the fraction of one turn corresponding to the predetermined displacement of the moving member.

As hitherto described, rotation of the shaft 18 and of the screw 10 by a predetermined fraction of a turn, causes a displacement of the fillet 23 of the screw 10 which returns to its initial position shown on FIG. 1 and for which the slots 25 and 25a are in a balanced position and the pressures are equal in the chambers 51, 51a, which sets the valves 38 and 39 in the closed position, thus interrupting the supply to the drive member 1.

Therefore, the action of the control member 85 on the saturation gate or valve 58, causes a first displacement of the moving member corresponding to a certain number of rotations of the shaft 18, and then by the action of the rod 8 and the screw 10, there is produced a second displacement of the moving member corresponding to one fraction of a rotation of the shaft 18.

I claim:

1. A control device for controlling a drive member, arranged to place a moving member in a predetermined position, said device comprising
   a. a first control member subjected to linear displacements,
   b. a screw mounted on said first control member,
   c. a shaft controlled from said drive member to rotate said screw,
   d. a sensor device mounted to slide on said screw and
   e. a fluid supply distributor for said drive member operatively connected to said sensor device,
   f. a second control member capable of acting for a corresponding displacement greater than one rotation of said screw,
   g. a saturation gate having a valve connected to said second control member and being associated with said sensor device.

2. A control device according to claim 1, wherein said sensor device comprises a sleeve which has two diametrically opposed slots orientated to follow the thread of said screw, said slots being connected in parallel to a control fluid circuit which acts in parallel on two valves of said supply distributor and which is connected to said saturation gate, for linking two conduits for circulating the fluid to a supply tank.

3. A control device according to claim 2, wherein said sensor sleeve is connected to one of the ends of a beam on which is articulated the valve of said distributor for supplying said drive member with operating fluid.

4. A control device according to claim 1, wherein said first control member comprises a rod mounted to slide in a body of the device, one of the ends of said sensor device being rotatably mounted on said rod and the other end of said sensor device being mounted to slide against the action of resilient means, in a bore of a shaft arranged for rotation by said drive member.

5. A control device according to claim 4, wherein said control rod is actuated from a stack of jacks mounted in cascade controlled from digital signals.

6. A control device according to claim 1, wherein said second control member has a tubular part in which is mounted to slide a screw engaged in a nut mounted at the end of said tubular part and bearing a guide finger engaged in a slot parallel to the axis of said rod and provided in the body of the device, the said screw acting at its other end on said valve of said saturation gate against the action of a resilient member and bearing a first pinion meshing with a second pinion integral with said shaft driven by said fluid-operated drive member.

* * * * *